Aug. 1, 1967  B. KALEN  3,333,402
HANGER AND CYCLONE SEPARATOR USED IN FLUIDIZED PROCESSES
Filed April 14, 1964  5 Sheets-Sheet 4

INVENTOR
BODO KALEN
BY
Seidel & Gonda
ATTORNEYS.

United States Patent Office 3,333,402
Patented Aug. 1, 1967

3,333,402
HANGER AND CYCLONE SEPARATOR USED IN FLUIDIZED PROCESSES
Bodo Kalen, Huntington, N.Y., assignor to The Ducon Company, Inc., Mineola, N.Y., a corporation of New York
Filed Apr. 14, 1964, Ser. No. 359,608
8 Claims. (Cl. 55—345)

This invention relates to equipment for fluidized processes, and more particularly, to fluid vessels having cyclone separators disposed therewithin and other related or similar equipment, and to cyclone separators and their hangers for vessels containing fluidized particles.

The present invention is adaptable for use in any fluidized high temperature system. By way of example, a preferred embodiment of the present invention will be illustrated in conjunction with a fluid catalytic reactor. However, the present invention has equal or even greater use with other vessels, such as in a fluid catalytic regenerator. High temperature fluid catalytic methods have gained wide-spread adoption in the petroleum and chemical industries. In these methods finely divided catalyst particles, such as catalyst particles having a mesh size of 80 mesh or smaller, are maintained suspended in a gas in the so-called "fluidized state" during reaction conditions. While in this fluid state these particles undergo the phenomenon known as hindered settling, namely they possess many of the properties of a liquid.

The use of the fluid catalytic procedure has enabled large units to operate continuously for extended periods of time under closely controlled conditions. The catalyst inventory of such units in processes where deposition of undesirable coke or other contaminates is encountered during the reaction stage may be maintained at a predetermined level by continuously circulating the catalyst from the fluid reactor to a regenerator where such coke or contaminates is removed by oxidative combustion. Thus, fluid units of enormous capacity, such as a through-put of sixty thousand barrels or more of charge per day, may operate on-stream for periods of as long as one year, or more, without being shut down.

Since many processes, as in the petroleum field employ high catalyst to charge ratios, the catalyst inventory of such systems is considerable. As many of the catalysts used in petroleum and chemical technology constitute relatively expensive materials, a close control of catalyst loss during on-stream operations must be effected. It is desirable that efficient separation of catalyst particles from the product or effluent gases from each fluid vessel be achieved. Any significant loss of catalyst particles due to entrainment with the product or effluent gases will assume extensive proportions during the continuous on-stream operation. For example, in the cracking of petroleum hydrocarbons, such as gas oil to gasoline, a change in efficiency of as little as one-tenth of one percent in the means for effecting the separation of the catalyst particles from the withdrawn product may mean the loss of many tons of catalyst a day from a large unit, depending upon its size. Aside from the cost of the catalyst, which is considerable, the dispersion of such catalyst particles may lead to air pollution problems which render satisfactory operations within a community impossible.

In the catalytic cracking of gas oil to gasoline, temperatures between about 900° and 1000° F. are encountered in the fluid reactor. Temperatures considerably above this level, as up to about 1300° F., are encountered in the fluid regenerator. These high operating temperatures over extended periods of time present difficult problems in suspending or supporting the cyclone system within the vessel wherein components are made from different materials having different temperature expansion rates. The problem is compounded by the trend toward larger and larger vessels thereby requiring larger and larger cyclone systems. Thus, there has been considerable effort in the past to resolve this long standing problem in the art of providing a practical, reliable and inexpensive or maintenance free suspension system for the cyclone system.

Reliability is an important feature in this art due to the astronomical losses incurred when the equipment is inoperative due to a failure of structure or a leak resulting in loss of the catalyst. Aside from the problem associated with expansion rates and the high stresses involved, the hanger system for the cyclone system should always be under tension, should not interfere with the ductwork of the cyclone system, should not incur any substantial amount of horizontal compensation due to temperature expansion, should function properly within the normal operative temperature ranges in the reactor or other vessel, and should take into consideration that the ends of the hanger system coupled to the vessel or reactor is at a lower temperature than the end of the hanger system coupled to the cyclone system.

It is an object of the present invention to provide a novel hanger system.

It is another object of the present invention to provide a novel hanger system for a cyclone system.

It is another object of the present invention to provide a fluid vessel to be operated at a high temperature in which cyclone separators may be supported in a proper manner.

It is another object of the present invention to provide a fluid vessel operable at high temperatures and within which cyclone separator systems may be suspended in a manner whereby little or no maintenance is required and the cyclone system will be properly suspended taking into consideration the temperatures involved.

It is another object of the present invention to provide a novel cyclone separator system of one or more stages and a novel hanger system therefor.

It is another object to provide a hanger system which requires less maintenance than those proposed heretofore.

Other objects will appear hereinafter.

Referring to the drawing in detail, wherein like numerals indicate like elements, there is shown in FIGURE 1 a pressure reaction apparatus designated generally as 10.

Figure 1:
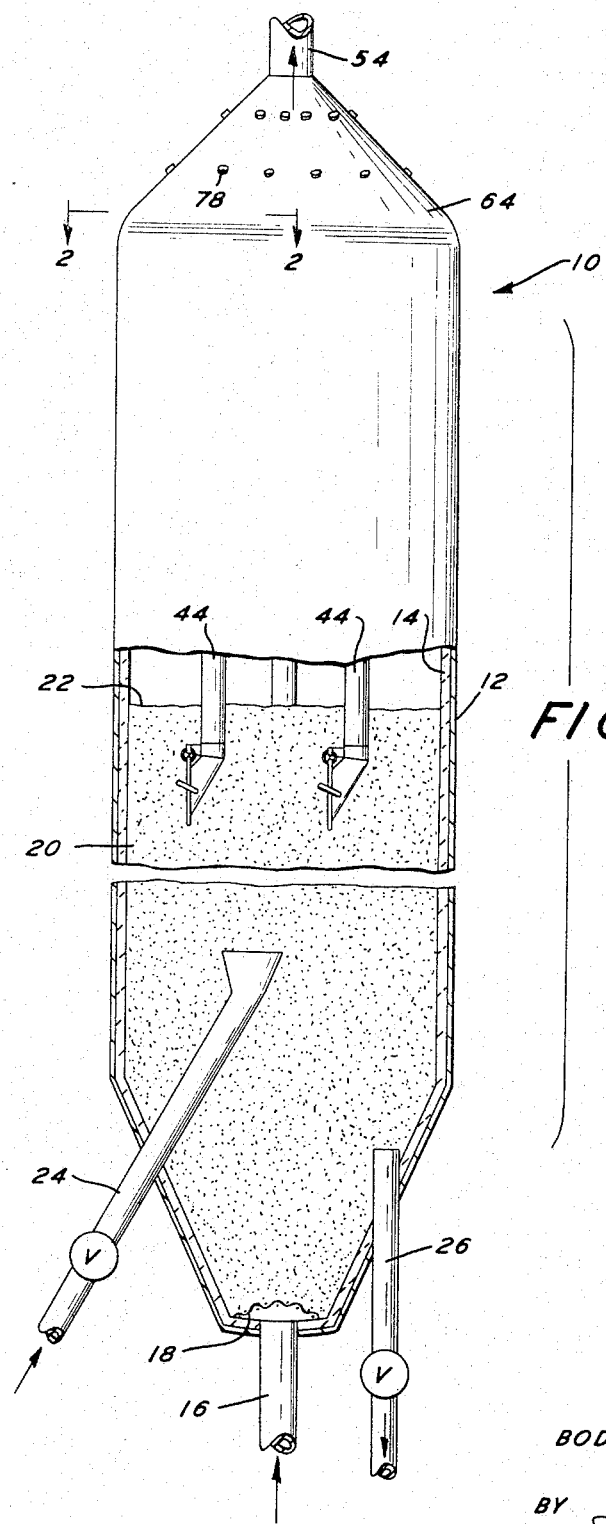
FIGURE 1 is a side elevation view, partly in section, of a catalytic reactor.

The apparatus 10 includes a reactor shell or vessel 12 having a refractory lining 14. The shell 12 has an inlet 16 for reactant gases which pass through a diffusing grid 18. The lower portion of the shell 12 is provided with a dense phase catalyst bed 20 having a bed level 22.

An inlet for introducing fluidized catalyst particles into the bed 20 is provided by conduit 24. While only one such conduit 24 is illustrated, it is of course feasible to employ a plurality of such conduits if the design of the apparatus 10 so requires. The shell 12 is also provided with an outlet conduit 26 through which catalyst particles may be transferred to another reactor or a regenerator. Conduits 24 and 26 are provided with conventional control devices such as valves and the like.

Figure 2:
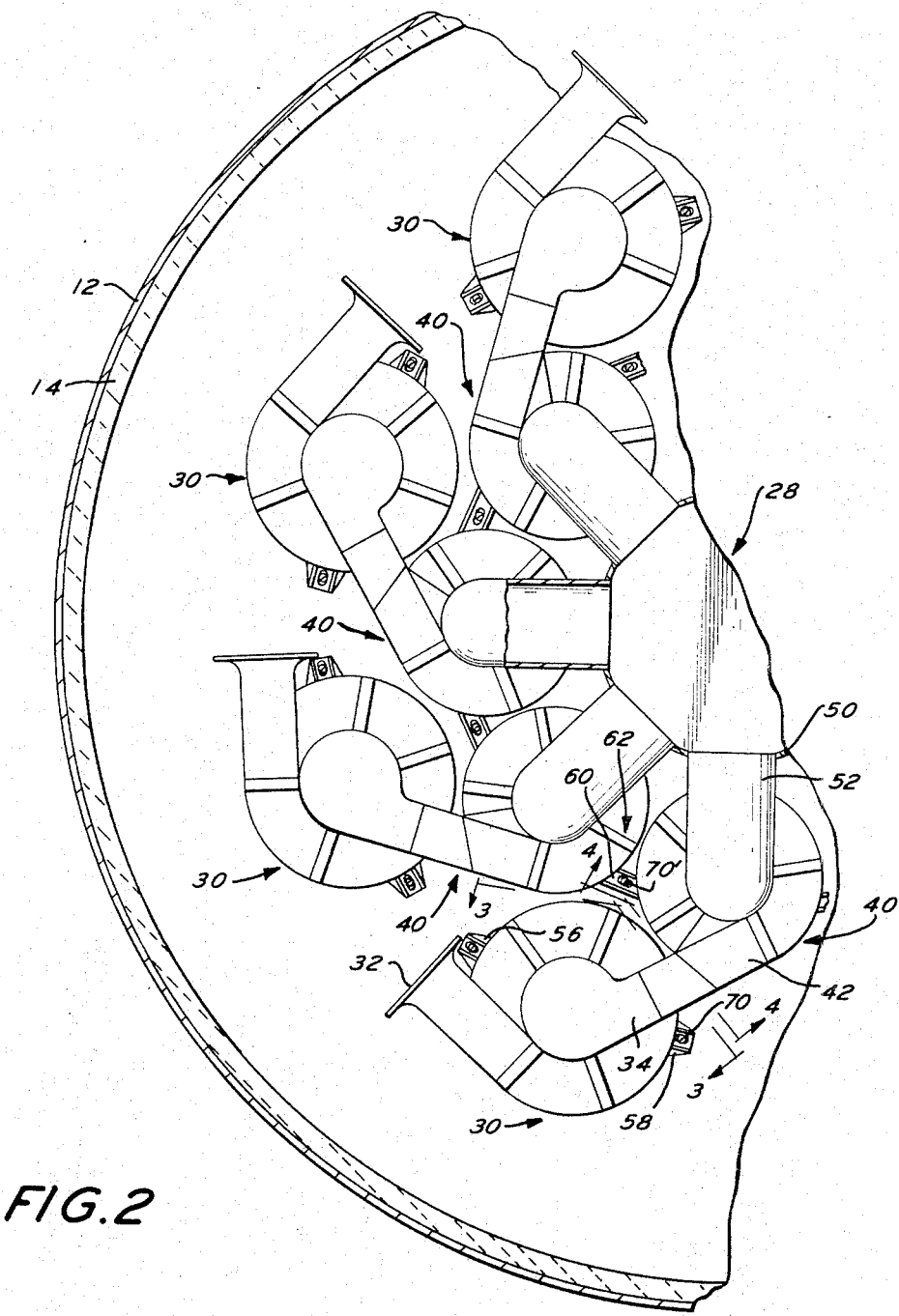
FIGURE 2 is a sectional view taken along line 2—2 in FIGURE 1.
Figure 3A:
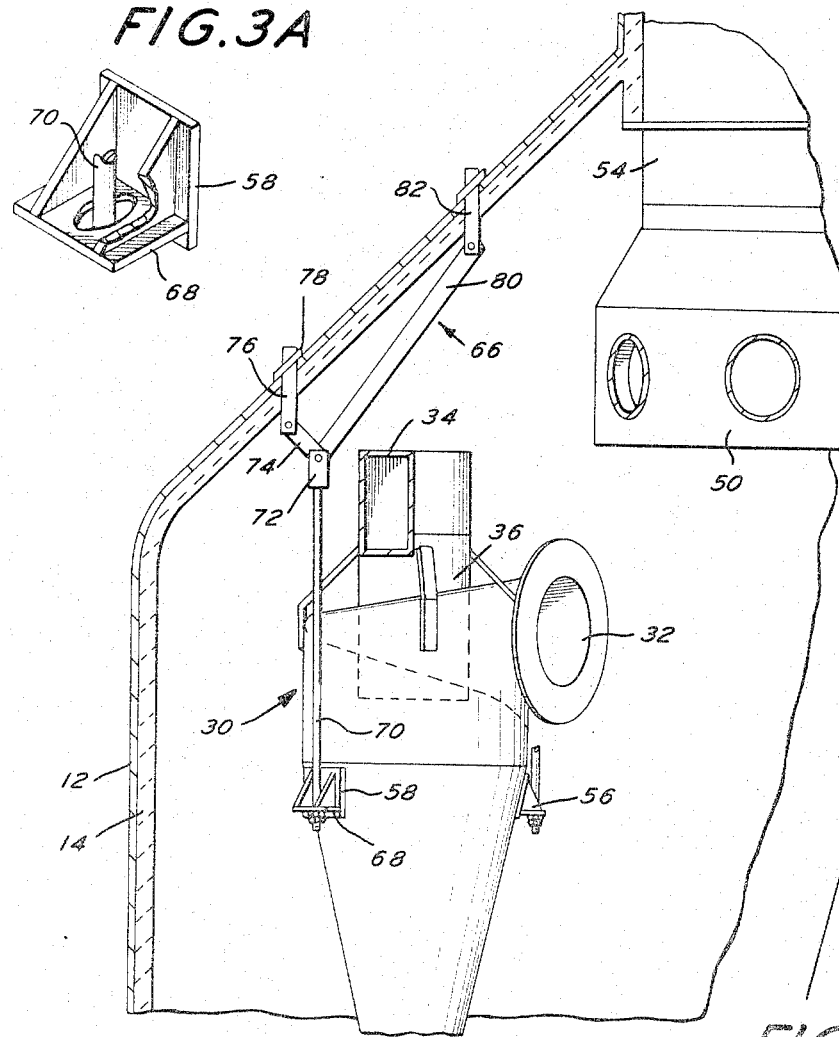
FIGURE 3A is a perspective view of a cyclone separator mounting bracket.
Figure 3:
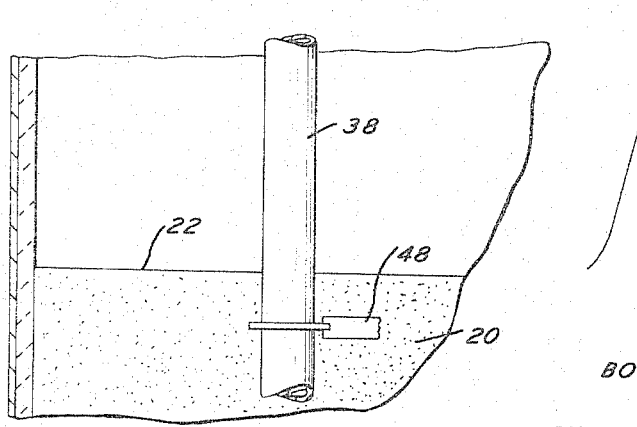
FIGURE 3 is a sectional view taken along the line 3—3 in FIGURE 2.
Figure 4A:
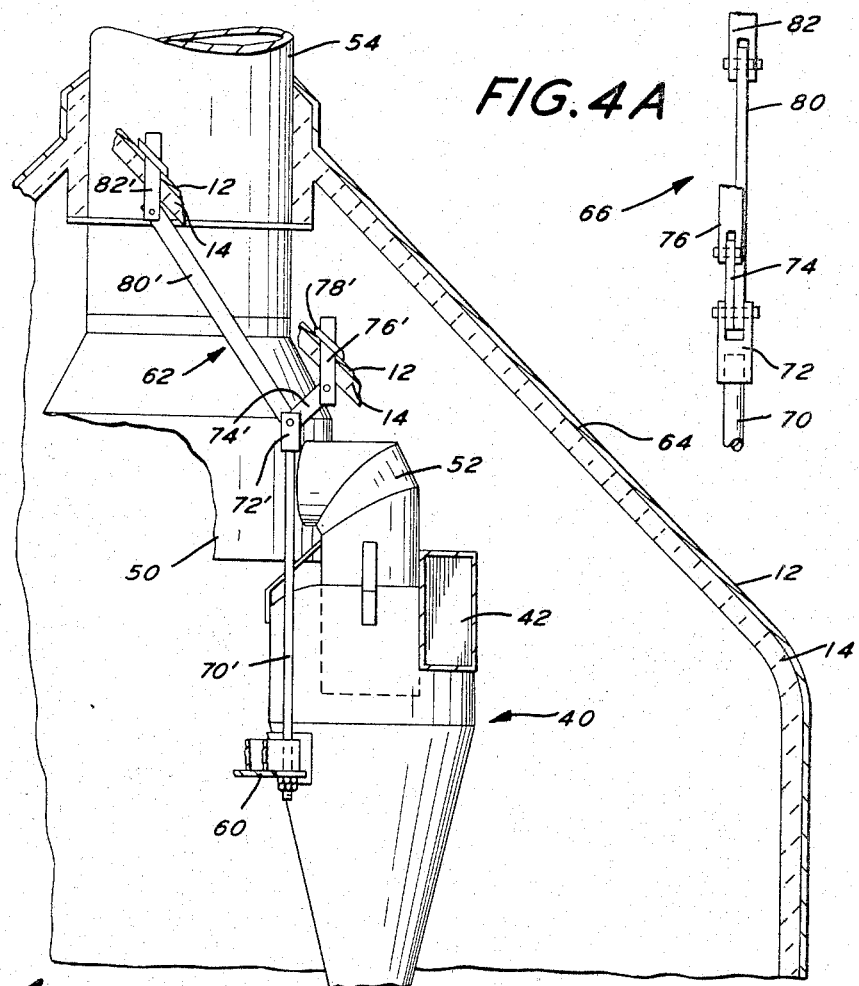
FIGURE 4A is an end view of the hanger system for one side of a cyclone separator.
Figure 4:
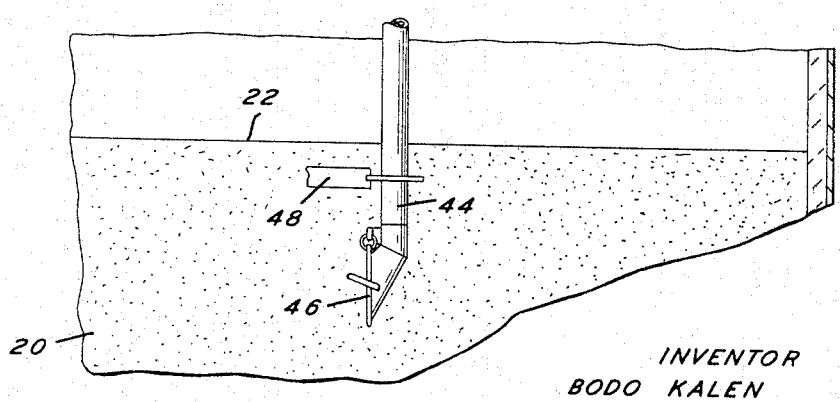
FIGURE 4 is a sectional view taken along the line 4—4 in FIGURE 2.

In FIGURES 2–4, there is illustrated a cyclone system designated generally as 28. Referring to FIGURE 2, the cyclone system includes a first stage cyclone separator 30 having an inlet 32 and an outlet 34. The outlet 34 is in communication with the interior of the cyclone separator 30 by way of a vertically disposed conduit 36. The cyclone separator 30 has a dipleg 38 which extends below the bed level 22 of the catalyst bed 20. A cyclone separator is a gas-particulate separator sometimes called a centrifugal separator.

When using expensive synthetic catalyst particles, and/or when operating a reactor in communities having air pollution laws, it is desirable to use more than one stage in the cyclone system. Thus, single stage cyclone systems generally have up to about 95% efficiency. By coupling the outlet of the separator 30 to the inlet of a second stage cyclone separator, and the outlet of the latter to a third stage if desired, efficiencies up to 99.99% may be obtained. For the purposes of the disclosure of the present invention, the cyclone system is illustrated as being a two stage system.

Thus, there is illustrated in FIGURE 4 a second stage cyclone separator designated as 40. Separator 40 has an inlet 42 which is coupled to the outlet 34 of the separator 30. Separator 40 is provided with a dipleg 44 which extends downwardly below the bed level 22 of the bed 20 and terminates at a commercially available valve 46. The legs 44 and 38 are interconnected with bracing 48 for purposes of stability.

The cyclone system 28 also includes a centrally disposed manifold 50 to which the upstanding outlet conduit 52 from the second stage separator 40 is connected. As will be apparent from FIGURE 2, a plurality of first and second stage separators form a part of the system 28, with the outlet conduit of each second stage being connected to the manifold or plenum chamber 50. In view of the fact that each of the first and second stages are identical, and each are suspended in the same manner, it is deemed necessary for purposes of the present invention to only describe the interrelationship between one of the first and second stage separators and their related hanger system.

The manifold 50 is in communication with an outlet conduit 54 through which the effluent gases may be conveyed to other apparatus such as a condenser and/or other processing equipment at which point the effluent gases will be separated into their constituents such as gasoline, kerosene, etc. Manifold 50 is subjected to a reduced pressure by way of conduit 54. It will be noted that the second stage separator 40 is connected to the manifold 50 and that the first stage separator 30 is connected to the second stage separator 40. The separators 30 and 40 individually may weigh as much as five tons. Thus, in elevated temperature operations it is difficult to support the weight of the first and second stage separators from the manifold 50, and furthermore a large diameter manifold is required in order to get the support points above the cyclone separators. The present invention permits a material reduction in the size of the manifold 50 when compared with manifolds proposed heretofore.

As shown more clearly in FIGURE 2, the first stage separator 30 is provided with mounting brackets 56 and 58 which are generally opposite one another, but lying on a common radius from the center of the manifold 50 which lies along the longitudinal axis of shell 12. Similar mounting brackets are provided on each of the other first stage separators. By so placing the mounting brackets 58 and 56, identical hanger devices can be utilized for each of the first stage separators thereby materially reducing the cost of the apparatus as well as the installation considerations.

Each of the second stage separators are substantially closer to the manifold. Instead of having separate mounting brackets generally opposite one another, as is the situation with the first stage separators, a bracket 60 may extend between each second stage separator 40 and the next adjacent second stage separator with each bracket 60 disposed an equal distance from the center of manifold 50. However, separate mounting brackets may be used as with the first stage separators. A hanger device designated generally as 62 suspends each set of separators 40 from the angularly disposed portion 64 of the shell 12. The shell 12 may be of the type having an arcuate top portion as opposed to an angularly disposed portion as illustrated. The hanger device 62 is different in size but identical in concept of construction with the hanger device designated generally as 66. Accordingly, only the hanger device 66 will be described in detail with hanger device 62 having corresponding primed numerals. The hanger device 66 is disposed on generally opposite sides of each of the first stage separators. It will be understood that each of the mounting brackets 56 and 58 are provided with a hanger device 66.

Mounting bracket 58 has a horizontally disposed portion 68 through which rod 70 extends. Rod 70 is disposed in an upright position and has a diameter which is smaller than the hole in the horizontally disposed portion 68 to provide a pivotable coupling between the rod 70 and the mounting bracket 58. Thus, rod 70 can be slightly cocked with respect to the first stage separator 30. The upper end of rod 70 terminates in a clevis 72. One end of a link 74 is pivotably coupled to the clevis 72. The other end of link 74 is pivotably coupled to one end of a mounting member 76. Mounting member 76 extends through the shell 12 and its lining at the angularly disposed portion 64. Alternatively, the mounting member 76 may be welded or otherwise joined to the interior of the shell 12. Member 76 may be generally perpendicular to the angularly disposed portion 64 or may be upright as desired. Member 76 is provided with a flange 78 which overlies the shell 12.

A link 80 has one end pivotably coupled to clevis 72. The other end of link 80 is pivotably coupled to one end of a mounting member 82. Mounting member 82 is identical with mounting member 76 and therefore need not be described in detail.

Figure 5:
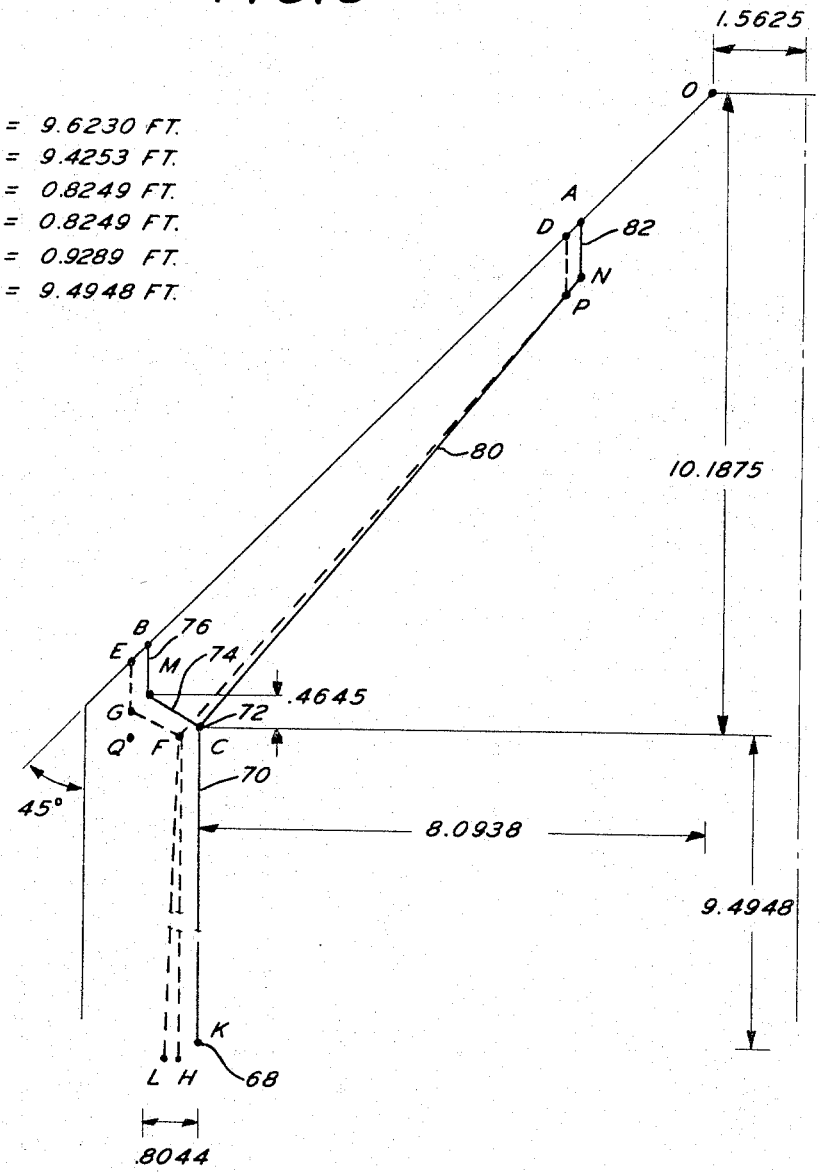
FIGURE 5 is a diagrammatic illustration of the cold and hot positions of the hanger system, with the cold position shown in full line and the hot position in phantom line.

The hanger device 66 is diagrammatically illustrated in solid and phantom lines in FIGURE 5. The solid line illustration represents the position of the elements at a cold condition. The phantom illustration represents the elements at the operating temperature of the reactor. As a general rule, there is a tolerance of plus or minus ⅛ of an inch with respect to the distance between the position of the hanger system and the position of the cyclone separators at the support point. Any substantial deviation over this tolerance would either result in an unsupported system or produce an upward component on the cyclone system, both of which would result in a buckling at some point in the cyclone system 28. The hanger system illustrated in the drawings and described above is deceptively simple in appearance.

There is set forth hereinafter an operative embodiment for the hanger device 66. It is assumed that the surface temperature of the shell 12 at the portion 64 is 300° F. and that the process temperature within the shell 12 is 940° F. The details of the operative embodiment are exemplary only and are taken from an operative embodiment of the present invention wherein the shell 12 is twenty three feet in diameter, conduit 54 was three feet in diameter, and the angularly disposed portion 64 is at a 45° angle. The shell 12 is made from carbon steel A.S.T.M. A201 grade A. Similar carbon steel was used for the plenum chamber 50 and the cyclone separators. The rods 70 were made from carbon steel A.S.T.M. A–193–B7 having 1% chromium and 0.2% molybdenum. The mounting members 76 and 82 were type 321 stainless steel.

In FIGURE 5, the linear thermal expansion from points A to D and B to E were at 300° F. The linear thermal expansion from points D to P and E to G were at an average temperature of 785° F. The linear thermal expansion between points P to F and G to F were at 940° F.

The rates of linear thermal expansion for the elements are as follows:

Shell 12 at 300° F.—0.001517 ft./ft.
Manifold 50 at 940° F.—0.00687 ft./ft.
Cyclone separators at 940° F.—0.00687 ft./ft.
Rods 70 at 940° F.—0.00687 ft./ft.
Members 76 and 82 at 785° F.—0.00717 ft./ft.

With the system operating at the temperatures referred to above, the following dimensions will exist:

$DE = 9.6230 + 9.6230 \times 0.001517 = 9.6376$
$GP = DE = 9.6376$
$FP = 9.4253 + 9.4253 \times 0.00687 = 9.4901$
$GF = .9289 + .9289 \times 0.00687 = .9353$
$EG = DP = .8249 + .8249 \times 0.00717 = .8308$ On the basis of trigonometry, it is possible to ascertain that the included angle FGM is 78°10′ and that the included angle FGQ is 56°50′. Likewise, it is possible to compute the dimension for QF to be .7829 feet and the dimension GQ to be .5117 feet.

In FIGURE 5, the length of the cyclone system from points O to K is 19.6823 feet. The linear thermal expansion in a downward direction of the cyclone system was $19.6823 \times 0.00687 = .1352$ feet. The linear thermal expansion of the cyclone system in a horizontal direction was $8.0938 \times 0.00687 = .0556$ feet. Hence, it will be noted that the horizontal thermal expansion may be neglected since this small amount can be accommodated by the loose support between the rods 70 and the hole in the horizontally disposed portion 68 of the mounting bracket 58.

Trigonometry will illustrate that the included angle LFH is 0°07′. Hence, the dimensions FH and FL are substantially identical. The dimension $$FH = 9.4948 + 9.4948 \times 0.00687 = 9.56 \text{ feet}$$

Since the linear thermal expansion of the cyclone system is .1352 feet as described above, the dimension O to L is 19.8175 feet. The sum of the dimensions FH, GQ, EG, BE, BO = 19.8142. Thus, the hanger device 66 positioned the cyclone separator 30 at a position which is 0.0033 feet (19.8175−19.8141) from the position it would normally assume at the temperature of 940° F. or an error of 1/32 of an inch. Such error is well within the maximum tolerance for the system of plus or minus 1/8 of an inch. Furthermore, since the positioning achieved by the present invention is so accurate, the vessel may normally be used over its normal temperature of operation without undue thermal stress. In addition, unusual thermal problems, such as "hot spots" sometimes encountered in the fluidized regeneration of cracking catalyst, may be dealt with better than is the case with existing vessels.

It will be noted that the link 74 is at an angle of approximately 45° with the horizontal. As this angle decreases, the horizontal linear thermal expansion component increases. Accordingly, a larger linear thermal expansion of the cyclone system can be accommodated. In the above illustrated embodiment, it was assumed that the elements 74, 76, 80 and 82 are of the same material. It is within the scope of the present invention to vary the material for these elements, so as to use metals having different linear thermal expansion coefficients for one or more of the elements 74, 76, 80 and 82. For example, link 74 may be an A.S.T.M. A–193–B7 alloy and link 80 may be stainless steel type 304. In this manner, various geometries for the linkage device 66 may be utilized and may be resorted to when the environment and ductwork of the cyclone system offers a difficult problem in orientation.

In view of the substantial cost for large vessels, it is contemplated that the linkage devices constituting the hanger system may be incorporated in new vessels and may be substituted for present devices in existing vessels. A significant advantage of this invention is that no hanger maintenance is required when operating temperatures are attained.

While the invention has been illustrated with a fluid reactor used in the petroleum industry, the invention may be applied to high temperature fluid vessels used in other arts, such as in metallurgy. By "high temperature" is meant temperatures at which thermal expansion problems are encountered in the absence of means such as the present invention.

The present invention permits the use of relatively small plenums. Furthermore, vertical support of the cyclone separator is achieved without reaction forces extending to the cyclone system or point of support. The use of relatively complex expansion joints between cyclone stages is eliminated.

The present invention may be embodied in other specific forms without departing from the spirit or essential attributes thereof and, accordingly, reference should be made to the appended claims, rather than to the foregoing specifications as indicating the scope of the invention.

I claim:

1. Apparatus for suspending a cyclone separator within a high temperature fluid vessel comprising a rod constructed and arranged to have its lower end coupled to a cylone separator, a first link pivotably coupled at one end to the upper end of the rod, a second link having one end pivotably coupled to the upper end of the rod, said first and second links defining an angle therebetween, a mounting member having one end pivotably coupled to the other end of the first link, and a second mounting member having one end pivotably coupled to the other end of the second link, and said mounting members being constructed and arranged to be connected to a stationary part of a vessel, the linear coefficient of thermal expansion of at least one of said links being different from the linear coefficient of expansion for said rod.

2. Apparatus in accordance with claim 1 wherein said second link is substantially longer than said first link.

3. Apparatus comprising a high temperature fluid vessel having an outlet conduit at the upper end of said vessel, a cyclone separator disposed within said vessel, the inlet to said separator being in communication with the interior of said vessel, the outlet of said cyclone separator being in communication with said conduit, and linkage means suspending said cyclone separator from said vessel, said linkage means including an upright member having its lower end coupled to said separator, a first link pivotably coupled to said vessel and the upper end of said member, a second link pivotably coupled to both the upper end of said member and said vessel said first and second links defining an angle therebetween, and said second link being longer than said first link.

4. Apparatus in accordance with claim 3 wherein the linear coefficient of thermal expansion of the first link differs from the linear coefficient of thermal expansion of the second link.

5. Apparatus in accordance with claim 3 in which the lower end of the upright member is pivotably coupled to the cyclone separator.

6. Apparatus in accordance with claim 3 including a second linkage means, said first and second linkage means being coupled to said cyclone separator at points arcuately disposed approximately 170° apart.

7. Apparatus comprising a high temperature fluid vessel, an outlet conduit in the upper portion of said vessel, a plurality of sets of first and second stage cyclone separators within said vessel, the outlet of the second stage separators being coupled to said conduit, the inlet for each first stage separator being in communication with the interior of said vessel, linkage means for suspending each of said separators in depending relation from said vessel, said linkage means including a bracket extending between and secured to adjacent second stage separators, an upright rod-like member having its lower end connected to said bracket, the upper end of said rod-like member being pivotably connected to one end of a pair of links, said links defining an angle therebetween and the other ends of said links being pivotally connected to said vessel at spaced points, and one link of each said linkage means being longer than its associated link.

8. Apparatus in accordance with claim 7 wherein each of said rod-like members are substantially equidistant from the longitudinal axis of said vessel.

References Cited

UNITED STATES PATENTS

| | | | |
|---|---|---|---|
| 1,396,939 | 11/1921 | Miller | 210—512 |
| 2,370,444 | 2/1945 | Bowman | 55—348 |
| 2,408,719 | 10/1946 | Abernethy | 248—317 |
| 2,524,916 | 10/1950 | Loos | 248—324 |
| 2,816,658 | 12/1957 | Braun et al. | 210—512 |
| 2,904,410 | 9/1959 | Traue | 55—343 |
| 2,985,516 | 5/1961 | Traue et al. | 248—17 |
| 3,254,476 | 6/1966 | Kusek et al. | 55—345 |

FOREIGN PATENTS 534,803   12/1956   Canada.

BARRY B. THORNTON, *Primary Examiner.*

B. NOZICK, *Assistant Examiner.*